(12) United States Patent
DeVos et al.

(10) Patent No.: US 7,939,179 B2
(45) Date of Patent: May 10, 2011

(54) LAMINATED STEEL APPLICATION FOR MAJOR APPLIANCES DOORS AND CASES

(75) Inventors: Richard DeVos, Louisville, KY (US);
Roger Nelson, Louisville, KY (US);
Daniel Wheat, Louisville, KY (US);
Oleg Berezovsky, Louisville, KY (US);
Geoffrey Ranard, Louisville, KY (US)

(73) Assignee: General Electric Company, Schenectady, NY (US)

( * ) Notice: Subject to any disclaimer, the term of this patent is extended or adjusted under 35 U.S.C. 154(b) by 391 days.

(21) Appl. No.: 11/957,525

(22) Filed: Dec. 17, 2007

(65) Prior Publication Data

US 2009/0155557 A1    Jun. 18, 2009

(51) Int. Cl.
*B32B 15/04* (2006.01)
*F23D 23/02* (2006.01)
*F23D 23/06* (2006.01)
*B65D 81/38* (2006.01)

(52) U.S. Cl. ... 428/621; 428/215; 428/332; 220/592.26; 220/592.25; 220/62.17

(58) Field of Classification Search .................. None
See application file for complete search history.

(56) References Cited

U.S. PATENT DOCUMENTS

| 5,494,942 A * | 2/1996 | Ottens et al. ............... 521/159 |
| 6,179,943 B1 * | 1/2001 | Welch et al. ............... 156/160 |
| 2006/0266385 A1 * | 11/2006 | Malaker ....................... 134/56 D |
| 2007/0040002 A1 * | 2/2007 | Talwar ......................... 228/101 |

* cited by examiner

*Primary Examiner* — Aaron Austin
(74) *Attorney, Agent, or Firm* — Fay Sharpe LLP

(57) ABSTRACT

A dent resistant laminated steel application is provided for a laminated appliance wall, including: an exterior cover having a first outer skin layer and at least a second substrate layer laminated thereto, wherein the first outer skin layer is stainless steel and overlays the second substrate layer. The second substrate layer can be bonded to the first outer skin layer, wherein the bonding material is disposed in the interspace between the first outer skin layer and the second substrate layer. The laminated wall can further include a first outer skin layer having a material thickness from about 0.014 to about 0.022 inches. The second substrate layer can be selected from the group consisting of fiberboard, galvanized steel, and polyester.

17 Claims, 3 Drawing Sheets

LAMINATED STEEL APPLICATION FOR MAJOR APPLIANCES DOORS AND CASES

BACKGROUND

Current appliance walls and appliance cases typically comprise one exterior cover layer produced from high-grade sheet steel, such as stainless steel, or from corrosion-protected sheet steel. The sheet thickness of current cover layers can be on the order of 0.016 to 0.034 inches. The thicker cover layers provide increased dent resistance, but involve much higher costs due to the increased amount of material used in the cover layer.

Dented surfaces occurring during shipping and handling result in damage to the finish of the appliance and ultimately to the return of the product to the manufacturer. Returned goods significantly affect profit margins for appliance manufacturers. Appliance damage rates may be significantly reduced by introduction of laminate steel onto appliance doors and/or appliance cases, while allowing additional cost savings by reducing the amount of relatively expensive material components (i.e. stainless steel).

The present disclosure relates to a laminated appliance wall including an exterior cover having at least two conjoined laminated layers. A bonding material or mechanical connection can be disposed between the laminated layers. The laminated layers include a first outer skin layer and at least a second substrate layer thereunder. The laminated wall can further include a third substrate layer underlying the second layer.

In the case of laminated appliance walls and housings, the wall shells or skin layers can be produced from high-grade sheet steel, such as stainless steel, or from corrosion-protected sheet steel. The second substrate layer can be produced from fiberboard, paper, vinyl, plastic, cold rolled steel, or other ferrous and non-ferrous materials. The lower grade cold rolled steel can comprise galvanized steel. The third layer can comprise foam material.

SUMMARY OF THE DISCLOSURE

It is accordingly an object of the disclosure to provide a laminated appliance wall which overcomes the dentability of low-strength (i.e. thin) outer covers and the high costs associated with thicker outer covers. The laminated appliance wall can comprise at least two conjoined laminated layers providing increased dent resistance while decreasing material costs.

With the foregoing and other objects in view there is provided, in accordance with the disclosure, a laminated appliance wall, including: an exterior cover having a first outer skin layer and at least a second substrate layer laminated thereto, wherein the first outer skin layer is stainless steel and overlays the second substrate layer. The second substrate layer can be connected or bonded to the first outer skin layer, wherein the bonding, epoxy adhesive, or mechanical connection is disposed in the interspace between the first outer skin layer and the second substrate layer. The laminated wall can further include a first outer skin layer having a material thickness from about 0.014 to about 0.022 inches. The second substrate layer can be selected from the group consisting of fiberboard, paper, galvanized steel, vinyl, polyester, and other ferrous and non-ferrous materials.

In accordance with another aspect of the disclosure, a laminated appliance wall can comprise an exterior laminated steel cover including a first outer skin layer and at least a second substrate layer. The first outer skin layer can be stainless steel and overlays the second substrate layer. The second substrate layer can be galvanized steel bonded or connected to the first outer skin layer. The bonding, epoxy adhesive, or mechanical connection can be disposed in the interspace between the first outer skin layer and the second substrate layer. The appliance wall can further include a third substrate layer underlying the second substrate layer, wherein the third substrate layer is foam material.

In accordance with still another aspect of the disclosure, a laminated appliance wall is provided comprising an exterior laminated steel cover including a first outer skin layer and at least a second substrate layer. The first outer skin layer is stainless steel and overlays the second substrate layer. The first outer skin layer can have a material thickness from about 0.014 to about 0.022 inches. The second substrate layer can be galvanized steel which can be bonded or connected to the first outer skin layer. The second substrate layer can have a material thickness less than the first outer skin layer, for example, from about 0.007 to about 0.015 inches. The bonding or connection can be disposed in the interspace between the first outer skin layer and the second substrate layer.

A laminated appliance housing and a laminated appliance door for a refrigeration appliance can be produced in a particularly durable vacuum-tight manner, along with a low weight and a low heat conduction, if the housing and/or the door include the laminated appliance wall according to the disclosure.

A laminated appliance oven muffle, which encloses the cooking compartment of a household oven, can be produced in a likewise particularly durable vacuum-tight manner, with a particularly low heat conduction and with a low weight, if the oven muffle includes the laminated appliance wall according to the disclosure.

Although the disclosure is illustrated and described herein as embodied in a laminated appliance wall, it is nevertheless not intended to be limited to the details shown, since various modifications and structural changes may be made therein without departing from the spirit of the disclosure and within the scope and range of equivalents of the claims.

The construction and method of operation of the disclosure, however, together with additional objects and advantages thereof will be best understood from the following description of specific embodiments when read in connection with the accompanying drawings.

DETAILED DESCRIPTION

Figure 1:
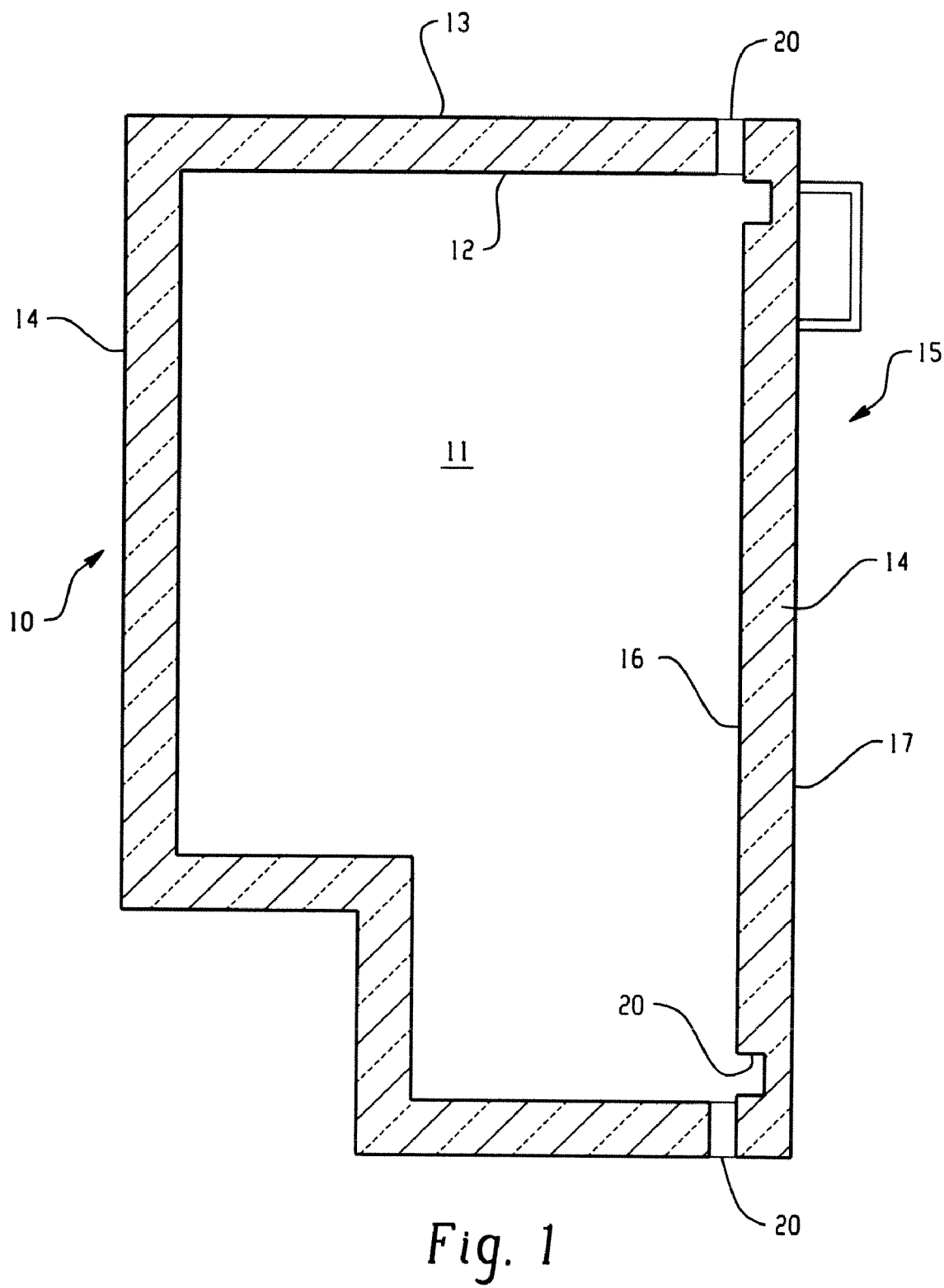
FIG. 1 is a simplified schematic sectional side view of a laminated appliance housing of a household refrigerator having two spaced-apart cover layers which can be joined to a connecting profile at free borders of the cover layers.

Referring now to the figures of the drawings in detail and first, particularly, to FIG. 1 thereof, there is shown an exemplary laminated appliance housing 10 which is suitable for use in a household refrigerator wall structure. A household refrigerator will be used to explain the laminated appliance housing, but it is to be appreciated that the subject disclosure can be used on any household appliance housings/structures, walls, doors, and handles.

The household refrigerator housing has a useful space 11 which can be configured as a refrigerating compartment and is lined by a cover layer 12 which serves as inner paneling and can be formed, for example, from a steel sheet, thermoformed plastic, or from a corrosion-protected steel sheet with a material thickness of approximately 0.0157 inches or from a metal-coated or laminated plastic sheet. At a distance from the interior cover layer 12, the housing 10 has a further exterior cover layer 13, which serves as a skin layer or outer paneling and can be formed from the materials which are used for producing the cover layer 12. Introduced between the two cover layers 12 and 13 is a supporting material which serves for supporting the cover layers and can be in the form of open-cell heat-insulation material 14, for example sheet-form polyurethane foam or sheet-form polystyrene foam. Such heat-insulation material can also be used in a door 15, fastened on the opening border of the housing, and serves for supporting an inner cover layer 16, which forms the inner door paneling, in relation to an outer cover layer 17, which serves as the skin door layer or outer door paneling. Both the cover layers 16 and 17 and the cover layers 12 and 13 can be connected to one another in a vacuum-tight manner at their free borders by a connecting profile 20, with the result that an evacuated interspace filled with heat-insulation material 14 can be formed between the two cover layers.

Figure 2:
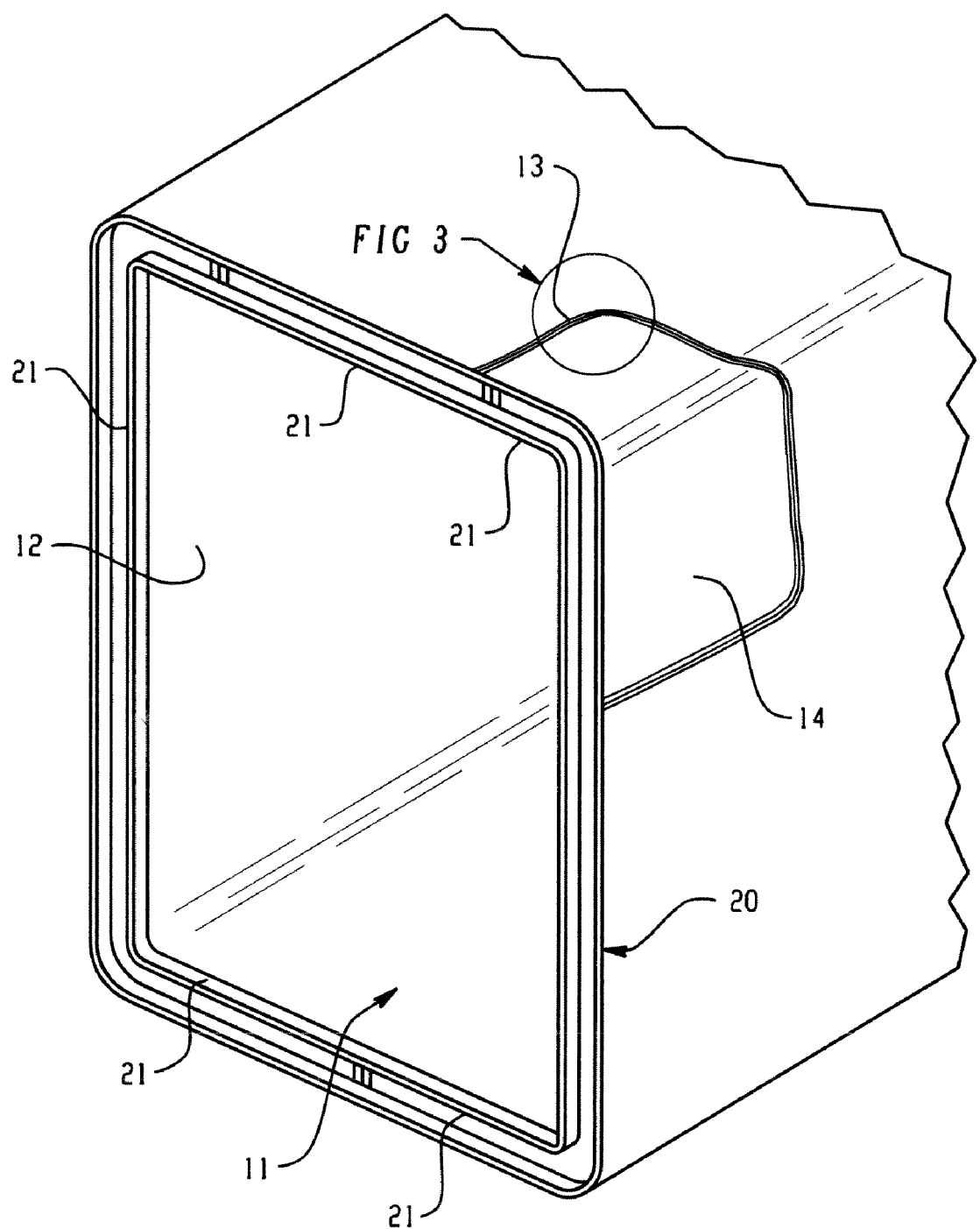
FIG. 2 is a fragmentary, three-dimensional frontal view of the housing with the connecting profile, which connects the cover layers of the housing; and, FIG. 3 is a fragmentary, diagrammatic view of a laminated exterior cover layer.

One exemplary embodiment for a refrigerator appliance housing is shown in FIG. 2, the connecting profile 20, which is shown using the example of the laminated appliance housing 10, is subdivided along its length into a plurality of profile sections 21. The profile sections 21 are configured cross-sectionally in the form of a U-profile.

Figure 3:
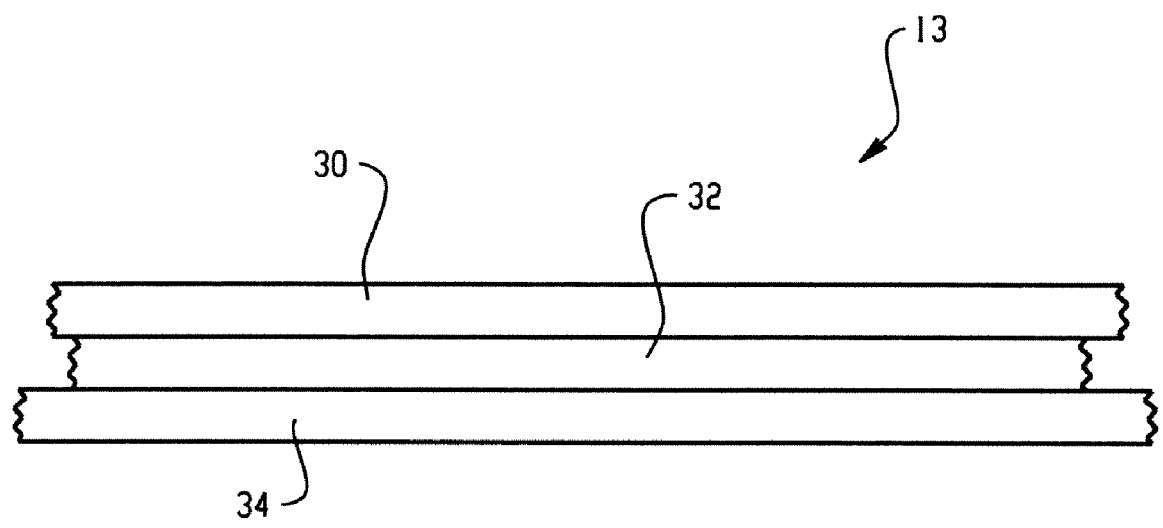

The exterior cover layer or exterior wall 13 according to the present disclosure is shown in detail in FIG. 3. The exterior cover layer can comprise a laminated wall including a first outer skin layer 30 and at least a second substrate layer 32 laminated thereto. The first outer skin layer 30 can be stainless steel and can overlay the second layer 32. The second substrate layer 32 can be bonded or connected to the first layer 30. The bonding material or connecting adhesive disposed in the interspace between the first layer 30 and the second layer 32 can include a resin, epoxy, or other bonding agent. Alternatively, the outer skin layer 30 and the second substrate layer 32 can be mechanically bonded or connected to one another by a physical connection such as tack welding.

In one exemplary embodiment, the first outer skin layer 30 can have a material thickness from about 0.014 to about 0.022 inches. The second substrate layer 32 can be selected from the group consisting of fiberboard, galvanized steel, and polyester. The second substrate layer 32 can have a material thickness from about 0.007 to about 0.030 inches.

In another exemplary embodiment, the second substrate layer 32 can be galvanized steel including a material thickness less than the first outer skin layer, for example, from about 0.007 to about 0.015 inches. Thus, the laminated exterior cover appliance wall 13, using galvanized steel for the second substrate layer 32 can have a combined material thickness from about 0.021 to about 0.037 inches. In still another embodiment, a third laminate layer 34, laminated to the second layer 32, can be provided for supporting the second layer 32. The third layer 34 can be foam material.

Using sample data from a series of dentability tests, Table 1 and 2 were compiled below. Table 1 displays dent test results of different materials for the outer cover layer 13. A plurality of tests was run using six different configurations for the cover layer 13 (Tests A-F and G-L). A two (2) inch ball was dropped on the sample cover layers from a height of six (6) inches and the extent of denting was recorded. Performance was assessed based on the level of dent resistance (i.e. dentability) provided by the exemplary material configurations used for the outer cover.

TABLE 1

DENTABILITY STUDY RESULTS
Dent Test of different Materials - [no foam]: 2" ball dropped from 6" height

| Test A Dent measurement .018 SS (in) | Test B Dent measurement .028 SS (in) | Test C Dent measurement .018 SS w/.011 fiber (in) | Test D Dent measurement .018 ss w/.030 fiber (in) | Test E. Dent measurement .018 ss w/.011 galv (in) | Test F Dent measurement .018 w/.011 polyester (in) |
|---|---|---|---|---|---|
| 1. 0.045 | 0.036 | 0.044 | 0.04 | 0.03 | 0.04 |
| 2. 0.042 | 0.037 | 0.038 | 0.037 | 0.027 | 0.041 |
| 3. | | 0.044 | | | |
| 0.0435 | 0.0365 | 0.0420 | 0.0385 | 0.0285 | 0.0405 |

Summary
1. .018" SS with laminated fiber performed worse than plain .028" SS but better than just plain .018" SS
2. .018" SS with laminated .011" galvanized performed better than the current .028" SS
3. .018" SS with laminated polyester performed worse than plain .028" SS but better than just plain .18" SS Referring to Table 1, Tests A and B included a single layer of stainless steel (SS) for layer 13. Test A included a layer thickness of 0.018 inches and Test B included a layer thickness of 0.028 inches. The test included at least two samples and the results were averaged. The 0.028 inch thick layer of stainless steel (Test B) provided an average dent measurement (i.e. depth of dent) of 0.0365 inches which was less than the measured dent for Test A (0.018 inch SS) having an average dent measurement of 0.0435 inches.

Tests C thru F involved a laminated layer having a first exterior skin layer and a second substrate layer. In Tests C-F, the skin layer was held constant and included a SS layer of 0.018 inches. The second substrate layer included the following thicknesses and materials: 0.011 inches of fiberboard, 0.030 inches of fiberboard, 0.01 inches of galvanized steel, and 0.011 inches of polyester, Tests C-F, respectively. As shown by the data in Test E, the best dent resistance (smallest dent measurement) was determined to be from a first skin layer of stainless steel having a thickness of 0.018 inches laminated to a second substrate layer of galvanized steel having a thickness of 0.011 inches. Test E provided an average dent measurement of 0.0285 inches, which represents an improvement over a single layer of SS having a thickness of 0.028 inches (Test B).

Similarly, sample data from a series of dentability tests were compiled in Table 2, in which a third substrate layer of foam was provided while maintaining the other variables as recited in Table 1. A plurality of tests was run using six different configurations for layer 13 (Tests G-L). A two (2)

inch ball was dropped on the sample cover layers from a height of six (6) inches and the extent of denting was recorded.

TABLE 2

Dent Test of different Materials - [foam backed]: 2" ball dropped from 6" height

| Test G Dent measurement .018 SS (in) | Test H Dent measurement .028 SS (in) | Test I Dent measurement .018 SS w/.011 fiber (in) | Test J Dent measurement .018 ss w/.030 fiber (in) | Test K Dent measurement .018 ss w/.011 galv (in) | Test L Dent measurement .018 w/.011 polyester (in) |
|---|---|---|---|---|---|
| 1. 0.034 | 0.017 | 0.03 | 0.03 | 0.016 | 0.024 |
| 2. 0.035 | 0.019 | 0.035 | 0.035 | 0.017 | 0.027 |
| 3. | 0.021 | | | | |
| 0.0345 | 0.0190 | 0.03250 | 0.0325 | 0.0165 | 0.0255 |

Summary
1. .018" SS with laminated fiber performed worse than plain .028" SS but better than just plain .018" SS
2. .018" SS with laminated .011" galvanized performed better than the current .028" SS
3. .018" SS with laminated polyester performed worse than plain .028" SS but better than just plain .018" SS Tests G and H included a single layer of foamed backed stainless steel (SS) for layer 13. Test G included a layer thickness of 0.018 inches and Test H included a layer thickness of 0.028 inches. The test included at least two samples and the results were averaged. The 0.028 inch thick layer of stainless steel (Test H) provided an average dent measurement of 0.0190 inches which was less than the measured dent for Test G (0.018 inch SS) having an average dent measurement of 0.0345 inches.

Tests I thru K involved a laminated cover having a first exterior skin layer, a second substrate layer, and a third substrate layer of foam. In Tests I-L, the skin layer was held constant and included a SS layer of 0.018 inches. The second substrate layer included the following thicknesses and materials: 0.011 inches of fiberboard, 0.030 inches of fiberboard, 0.011 inches of galvanized steel, and 0.011 inches of polyester, Tests I-L, respectively. As shown by the data in Test K, the best dent resistance was determined to be from a first skin layer of stainless steel having a thickness of 0.018 inches laminated to a second substrate layer of galvanized steel having a thickness of 0.011 inches, and a third substrate layer of foam. Test K provided an average dent measurement of 0.0165 inches, which represents an improvement over a single layer of SS having a thickness of 0.028 inches (Test H).

As detailed above, two or three laminated layers including a layer of lighter gauge SS, a layer of galvanized steel, and a layer of foam (or foam backing) provides suitable dent resistance while reducing the material costs associated with a single layer of heavy gauge SS.

The exemplary embodiment or embodiments have been described with reference to preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A laminated appliance wall providing dent resistance, comprising:
   an exterior cover layer, an interior cover layer, and an insulating material layer between said exterior layer and said interior layer;
   said exterior layer including a first outer skin layer and at least a second substrate layer laminated thereto;
   said first outer skin layer is stainless steel having a first material thickness and overlays said second substrate layer having a second material thickness whereby said first material thickness is greater than said second material thickness thereby increasing the dent resistance of the appliance wall;
   said first outer skin layer exposed to the exterior of said appliance wall;
   said second substrate layer is connected to said first outer skin layer; and,
   a connection disposed in the interspace between said first outer skin layer and said second substrate layer wherein said connection is selected from the group consisting of resin, epoxy, and tack welding.

2. The laminated appliance wall according to claim 1, wherein said first outer skin layer having a material thickness from about 0.014 to about 0.022 inches.

3. The laminated appliance wall according to claim 2, wherein said second substrate layer is selected from the group consisting of fiberboard, galvanized steel, and polyester.

4. The laminated appliance wall according to claim 3, wherein said second substrate layer having a material thickness from about 0.011 to about 0.030 inches.

5. The laminated appliance wall according to claim 2, wherein said second substrate layer is galvanized steel.

6. The laminated appliance wall according to claim 5, wherein said second substrate layer having a material thickness from about 0.009 to about 0.013 inches.

7. The laminated appliance wall according to claim 6, wherein said first outer skin layer and said second substrate layer having a combined material thickness from about 0.026 to about 0.034 inches.

8. The laminated appliance wall according to claim 7, further including a third substrate layer underlying said second layer, wherein said third layer is foam material.

9. A laminated appliance wall for dent resistance, comprising:
   an exterior laminated steel cover layer, an interior cover layer, and an insulating material layer between said exterior layer and said interior layer;
   said exterior layer including a first outer skin layer and at least a second substrate layer;
   said first outer skin layer is stainless steel having a first material thickness and overlays said second substrate layer having a second material thickness;
   said first material thickness being greater than said second material thickness;
   said second substrate layer is galvanized steel connected to said first outer skin layer;
   a connection is disposed in the interspace between said first outer skin layer and said second substrate layer wherein said connection is selected from the group consisting of resin, epoxy, and tack welding; and, said cover layer further including a third substrate layer underlying and contiguous with said second substrate layer, wherein said third substrate layer is foam material thereby increasing the dent resistance of the appliance wall.

10. The laminated appliance wall according to claim 9, wherein said first outer skin layer having a material thickness from about 0.014 to about 0.022 inches.

11. The laminated appliance wall according to claim 10, wherein said second substrate layer having a material thickness from about 0.007 to about 0.015 inches.

12. The laminated appliance wall according to claim 11, wherein said first outer skin layer and said second substrate layer having a combined material thickness from about 0.021 to about 0.037 inches.

13. In combination with a refrigeration appliance, the laminated appliance wall according to claim 9.

14. In combination with a household oven, the laminated appliance wall according to claim 9.

15. A laminated appliance wall for dent resistance, comprising:
   an exterior laminated steel cover layer, an interior cover layer, and an insulating material layer between said exterior layer and said interior layer;
   said exterior cover layer including a first outer skin layer and at least a second substrate layer;
   said first outer skin layer is stainless steel and overlays said second substrate layer;
   said first outer skin layer having a material thickness;
   said second substrate layer is galvanized steel bonded to said first layer;
   said second substrate layer having a material thickness;
   a bonding material disposed in the interspace between said first outer skin layer and said second substrate layer wherein said bonding material is selected from the group consisting of resin, epoxy, and tack welds; and,
   said thickness of said first outer skin layer is greater than said thickness of said second substrate layer thereby increasing the dent resistance of the appliance wall.

16. The laminated appliance wall according to claim 15, wherein said thickness of said first outer skin layer is from about 0.014 to about 0.022 inches and said second substrate layer is galvanized steel including a thickness from about 0.007 to about 0.015 inches.

17. The laminated appliance wall according to claim 15, further including a third substrate layer underlying said second substrate layer, wherein said third substrate layer is foam material.

* * * * *